July 15, 1924.  
J. W. HANNAN ET AL  
EMERGENCY TIRE  
Filed Aug. 31, 1921

Inventors  
Jerome W. Hannan,  
Clarence A. Notman,  
By  
Attorneys

July 15, 1924.  
J. W. HANNAN ET AL  
EMERGENCY TIRE  
Filed Aug. 31, 1921  
1,501,399  
2 Sheets-Sheet 2
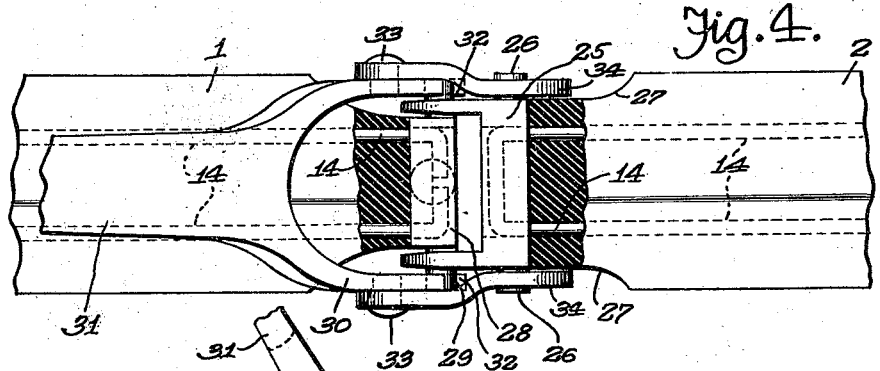
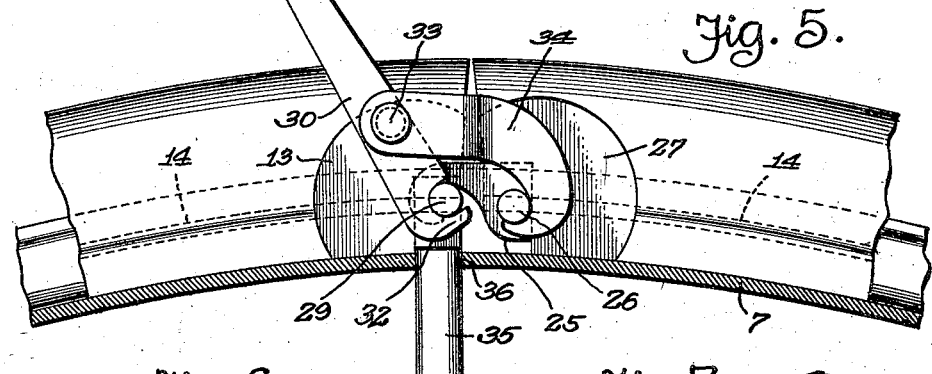
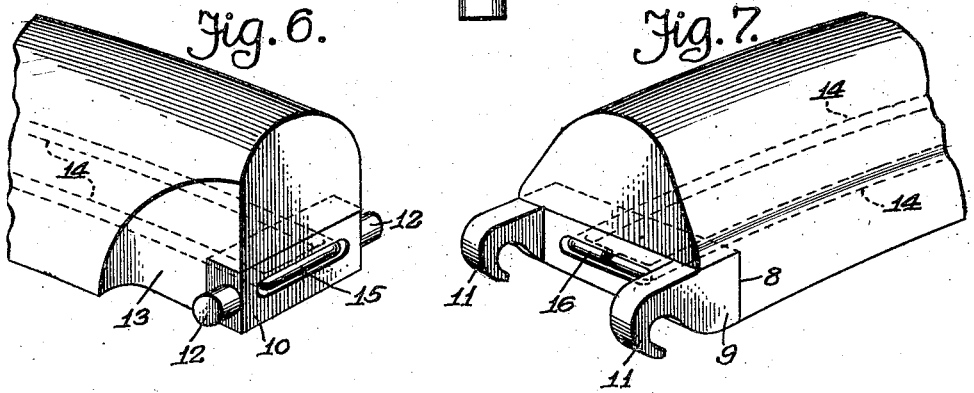
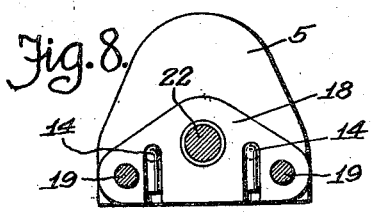
Inventors  
Jerome W. Hannan,  
Clarence A. Notman,  
By  
Attorneys Patented July 15, 1924.

1,501,399

UNITED STATES PATENT OFFICE.

JEROME W. HANNAN, OF WAYNE, AND CLARENCE A. NOTMAN, OF DETROIT, MICHIGAN.

EMERGENCY TIRE.

Application filed August 31, 1921. Serial No. 497,106.

*To all whom it may concern:*

Be it known that we, (*a*) JEROME W. HANNAN and (*b*) CLARENCE A. NOTMAN, citizens of the United States of America, residing at (*a*) Wayne, and (*b*) Detroit, in the county of Wayne and State of Michigan, have invented certain new and useful Improvements in Emergency Tires, of which the following is a specification, reference being had therein to the accompanying drawings.

This invention relates to emergency tires for motor vehicles and more particularly automobiles, bicycles or any wheels provided with pneumatic tires; it being a well known fact that when such tires are punctured or otherwise deflated that considerable time and labor are required to mend the tire and it is not always convenient to immediately do so, consequently the outer casings of pneumatic tires are often cut and otherwise injured by traveling on the same when deflated.

Our invention aims to provide a tire that may be easily and quickly substituted for a deflated tire and when our tire is in place it affords a resilient periphery or tread for a wheel so that the wheel may be safely used and travel continued until the usual tire may again be placed on the wheel.

Our invention further aims to provide an emergency tire composed of articulated sections, some of which permit of the tire being fitted on wheels of various sizes and the sections are articulated in a manner which permits of the tire being drawn taut on the rim of the wheel and positively held against accidental displacement. Since the tire sections are made of a resilient material, as solid rubber or the like, provision is made to protect the rubber from being unduly stretched when the tire is placed on a wheel and drawn taut.

Our invention further aims to accomplish the above results by a simple, durable and inexpensive construction that will be hereinafter described and then claimed.

Reference will now be had to the drawings, wherein

Fig. 4 is a plan of the tire partly broken away and partly in section, showing the position of a tool for connecting and disconnecting ends of the emergency tire;

Fig. 5 is a side elevation of the same;

Figs. 6 and 7 are perspective views of complemental ends of emergency tire members, and Fig. 8 is a cross sectional view taken on the line VIII—VIII of Fig. 2.

Figure 1:
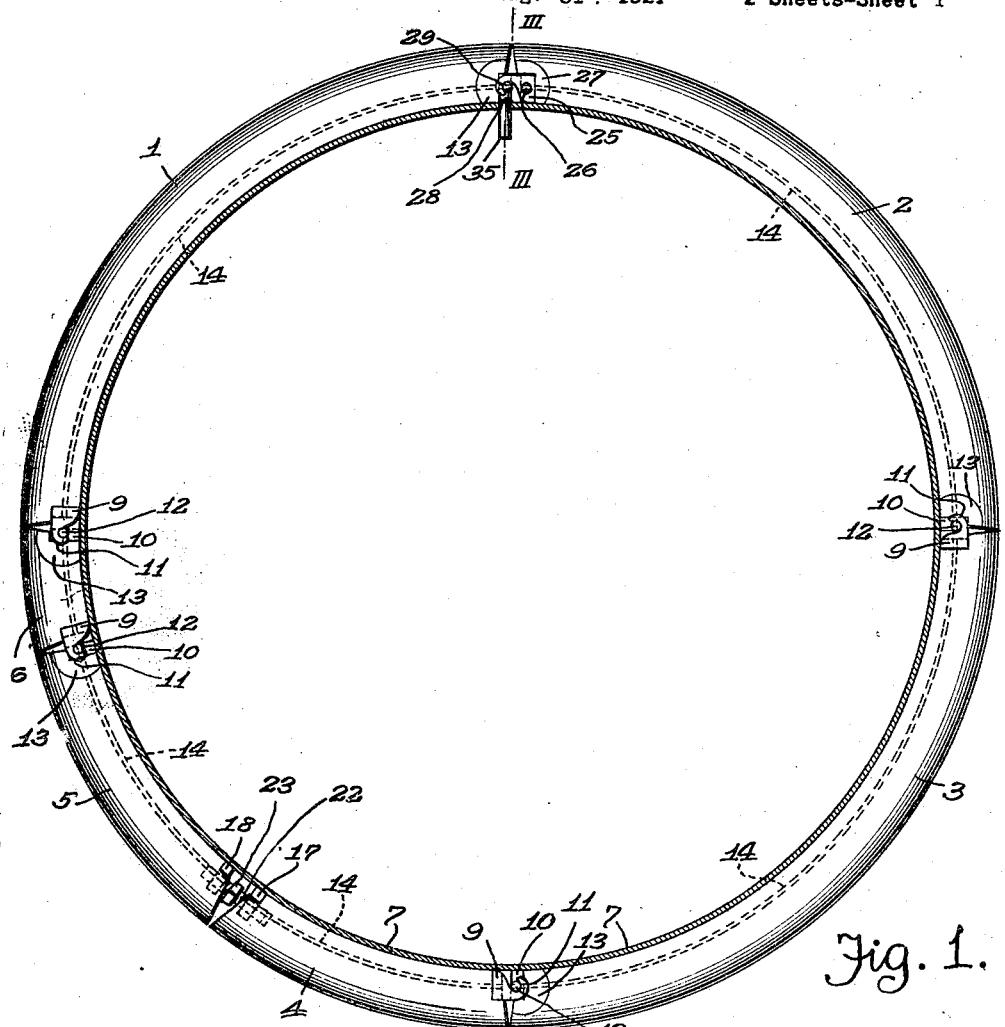
Figure 1 is a side elevation of the emergency tire on a rim and the rim has been shown in section.
Figures 2, 3:
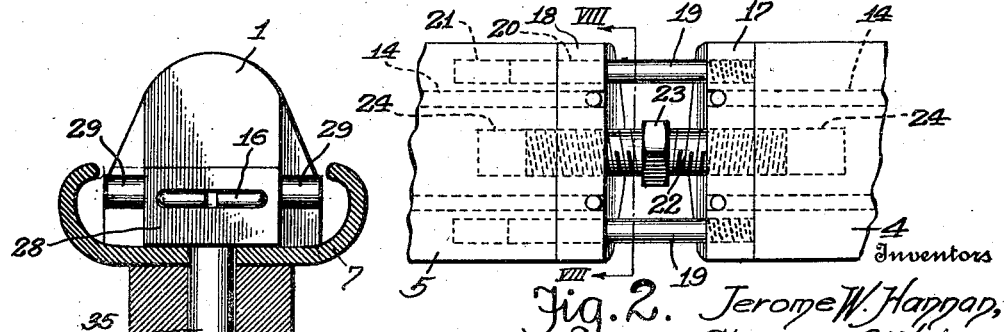
Fig. 2 is a plan of a take-up connection between two of the sections of the tire.
Fig. 3 is an enlarged cross sectional view taken on the line III—III of Fig. 1.

The emergency tire comprises a plurality of sections or members which have been individually designated 1, 2, 3, 4, 5 and 6. The members 1, 2 and 3 are practically the same length and contour; the members 4 and 5 practically the same length and contour, but of less length than the members 1, 2 and 3, and the member 6 of less length than any of the other members, said member being used so that the circumference of the emergency tire may be increased or decreased and thus permit of the tire being fitted on rims of different sizes. Other provision is also made for increasing or decreasing the circumference of the emergency tire by means associated with the tire members 4 and 5, as will hereinafter appear.

All of the tire members are preferably made of solid rubber or other resilient material and the ends of said members are articulated so that there are a series or a strip of links that may be easily and quickly trained about a wheel rim 7 and the ends of the links or members connected.

The connections between the tire members 2 and 3, 3 and 4, 5 and 6, and 6 and 1, are identical and for such connection reference will be had to Figs. 6 and 7. The confronting or adjacent ends of the members are undercut, as at 8 to receive coupling blocks 9 and 10, the block 9 having hooks 11 to engage over pins 12 carried by the block 10, and the hooks and pins are preferably at the sides or ends of the blocks. The tire members or sections 1 and 2 have side walls thereof recessed, as at 13 and 27 to provide clearance when connecting the hook block 25 to the pin block 28, also to provide clearance for a tool employed for connecting and disconnecting the pins and hooks of the tire sections 1 and 2. The tire sections 2, 3, 5 and 6 are also provided with side recesses 13 to facilitate placing the hooks 11 in engagement with the pins 12 when connecting the coupling blocks.

It is preferable to locate a hook block at one end of a tire member and a pin block at the opposite end and these blocks are held in place and connected by oblong links 14 extending throughout the length of each tire member and embedded therein. Each link is preferably made of wire with a loop end 15 thereof anchored in the pin block 10 and the opposite end of the link anchored in the hook block 9. With the link open it is possible to place it in engagement with the pin block 10, the hook block 9 and have it properly embedded in the tire member, and then the open end of the link can be closed, as at 16, so that the hook and pin blocks are connected. Each link will relieve its tire member of stresses and strains during the coupling of the tire member and prevent undue stretching of the resilient material forming the greater part of each tire member.

The connection between the tire members 4 and 5 is established by blocks 17 and 18 connected by links to the hook and pin blocks at the other ends of the tire members, and the ends of the links, at the blocks 17 and 18, are disposed at an angle and countersunk in the blocks, as shown in Fig. 8. The block 17 has dowel pins 19 extending into openings 20 in the block 18 and into recesses 21 of the resilient material adjacent the block 18. The dowel pins 19 are at the sides or ends of the blocks 17 and 18, and intermediate the ends thereof, is a turnbuckle, preferably in the form of a right and left handed threaded screw 22 having a nut 23. The screw is in screwthreaded engagement with the blocks 17 and 18 and recesses 24 in the tire members 4 and 5 provide clearance for the ends of the screw. By virtue of this turnbuckle the adjacent ends of the tire members 4 and 5 can be adjusted relative to each other to increase or decrease the over-all length of said tire members. This adjustment, together with that attained by the short tire member 6, permits of the emergency tire being properly fitted on wheel rims that may vary slightly in diameter.

From the connection so far described it is obvious that the tire members may be easily and quickly articulated, to provide a linkage formation, which may be trained about the rim 7 between the clencher flanges thereof, after a deflated tire is removed, and reference will now be had to the connection between the confronting ends of the tire members 1 and 2 for maintaining all the tire members about the rim 7.

The connection includes a hook block 25 somewhat similar to the hook block 9, with the exception that the hook block 25 is provided with side pins or studs 26 and the sides of the tire member 2 are cut away or recessed, as at 27 to provide clearance for the studs 26 and a coupling tool. The tire member 1 has a pin block 28 with the pins 29 thereof of greater length than the pins 12 of the blocks 10, and these pins are of greater length in order to permit of a coupling tool being used for connecting and disconnecting the blocks 25 and 28. The coupling tool comprises a yoke 30 having a handle 31 and hook shaped ends 32 adapted to engage over the long pins 29. Pivotally connected to the sides of the yoke 30, as at 33 are hook shaped claws 34 adapted to engage over the studs 26 of the block 25. The tool has been shown in Figs. 4 and 5 as in position relative to the blocks 25 and 28, the handle 31 of the tool having been swung in a direction of the tire member 1 to pull the tire member 2 towards the tire member 1 so that the hooks of the block 25 engage over the long pins 29 of the block 28. In so connecting the blocks the tire members are drawn taut about the rim 7 and have a clamping action thereon. Even should the tire become loose on the rim it cannot become laterally displaced by reason of the clencher flanges of said rim, and to prevent the circumferential shifting of the tire on the rim, the block 28 has a pin 35 extending through the usual air valve opening 36 of the rim 7.

To disconnect the blocks 25 and 28 the handle 31 is shifted toward the tire member 1 and then quickly moved towards the tire member 2, such movement causing the hooks of the block 25 to spring out of engagement with the pins 29 of the block 28, and with such movement the tool becomes released relative to the pins 29 and the studs 26.

The tire members 1 to 6 inclusive may be of any desired cross sectional shape so long as said tire members will afford a resilient tire or tread to prevent the rim 7 from being injured during the movement of a vehicle equipped with the emergency tire, and it is apparent that the tire can be readily carried collapsed, in an automobile kit or under the seat of an automobile, so as to be ready for instant use should a pneumatic tire be punctured or otherwise injured. The disconnected tire members may be compactly assembled and when so arranged occupy a comparatively small space.

One embodiment of our invention has been illustrated, but it is to be understood that the structural elements are susceptible to such changes, in size, shape and manner of assemblage, as fall within the scope of the appended claims.

What we claim is:—

1. An emergency tire comprising a plurality of members adapted to be connected in link formation and anchored about the rim of a wheel, some of said members being of equal length, other of said members being approximately of equal length and of less length than the first mentioned members, and still another member of less length than any of the aforementioned members adapted to be removed to decrease the circumference of the tire, and means connecting the second mentioned members so that the circumference of the tire may be increased or decreased with or independently of the last mentioned member.

2. In an emergency tire wherein articulated members are mounted circumferentially of a wheel rim and adapted to be drawn taut thereon, means connecting two of said members for drawing said members taut, said means including blocks, pins carried by one of said blocks and extending into the other of said blocks to guide one block relative to the other, and a turnbuckle connecting said blocks.

In testimony whereof we affix our signatures in presence of two witnesses.

JEROME W. HANNAN.
CLARENCE A. NOTMAN.

Witnesses:
   CHAS. W. STAUFFIGER,
   KARL H. BUTLER.